(12) United States Patent
Opel et al.

(10) Patent No.: US 9,333,950 B2
(45) Date of Patent: May 10, 2016

(54) WINDOW CLEANING SYSTEM FOR A MOTOR VEHICLE

(75) Inventors: Patrick Opel, Rotenburg (DE); Nico Schmidt, Nentershausen (DE); Thomas Werner, Nentershausen (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 1201 days.

(21) Appl. No.: 12/265,864

(22) Filed: Nov. 6, 2008

(65) Prior Publication Data
US 2009/0139551 A1 Jun. 4, 2009

(30) Foreign Application Priority Data

Nov. 7, 2007 (DE) .......... 10 2007 053 096

(51) Int. Cl.
*B60S 1/48* (2006.01)
*F16L 37/098* (2006.01)
*F16L 37/086* (2006.01)
*F16L 37/10* (2006.01)
*F16L 37/138* (2006.01)

(52) U.S. Cl.
CPC .. *B60S 1/481* (2013.01); *B60S 1/48* (2013.01); *F16L 37/086* (2013.01); *F16L 37/0982* (2013.01); *F16L 37/101* (2013.01); *F16L 37/138* (2013.01)

(58) Field of Classification Search
CPC .......... B60S 1/481; B60S 1/48; F16L 37/138; F16L 37/086; F16L 37/101; F16L 37/0987; F16L 37/0985; F16L 37/0982
USPC .......... 134/6, 34–36, 42, 94.1–95.3, 134/103.2–103.3, 114; 285/305, 315–316; 239/284.1
See application file for complete search history.

(56) References Cited

U.S. PATENT DOCUMENTS

| | | | | |
|---|---|---|---|---|
| 3,601,459 A | * | 8/1971 | Cutting | F16C 27/063 384/100 |
| 4,533,194 A | * | 8/1985 | Boichut et al. | 439/347 |
| 5,087,081 A | * | 2/1992 | Yoon | 285/8 |
| 5,332,270 A | * | 7/1994 | Petty et al. | 285/319 |
| 5,547,166 A | * | 8/1996 | Engdahl | 251/149.6 |
| 5,944,910 A | * | 8/1999 | Fujii | 134/6 |
| 5,984,265 A | * | 11/1999 | Engdahl | 251/148 |
| 6,672,625 B2 | * | 1/2004 | Trede et al. | 285/81 |
| 6,863,314 B2 | * | 3/2005 | Guest | F16L 37/0985 285/308 |
| 7,121,592 B2 | * | 10/2006 | Sazbo et al. | 285/305 |
| 2004/0060599 A1 | * | 4/2004 | Miyajima | F16K 15/026 137/515 |
| 2007/0209687 A1 | * | 9/2007 | Fistler et al. | 134/111 |

FOREIGN PATENT DOCUMENTS

| | | | |
|---|---|---|---|
| DE | 1 814 254 A | 6/1970 | F16L 37/12 |
| DE | 201 04 406 U1 | 9/2001 | B60S 1/46 |

* cited by examiner

*Primary Examiner* — Joseph L Perrin
*Assistant Examiner* — Kevin G Lee
(74) *Attorney, Agent, or Firm* — Slayden Grubert Beard PLLC

(57) ABSTRACT

In the case of a window cleaning system for a motor vehicle, a washing fluid line (6) is manufactured integrally with plug-type coupling parts (8). Movable components and a sealing ring (15) are arranged on bushing-type coupling parts (9). The bushing-type coupling parts (9) are arranged on a washing fluid pump (2), on washing nozzles (4) and on a T connector (7). By this means, the window cleaning system is constructed in a particularly simple manner and can be manufactured cost-effectively.

16 Claims, 2 Drawing Sheets

WINDOW CLEANING SYSTEM FOR A MOTOR VEHICLE

CROSS-REFERENCE TO RELATED APPLICATIONS

This application claims priority to German Patent Application No. 10 2007 053 096.1 filed Nov. 7, 2007, the contents of which is incorporated herein by reference in its entirety.

TECHNICAL FIELD

The invention relates to a window cleaning system for a motor vehicle, with a washing fluid pump for conveying washing fluid, with at least one washing nozzle for spraying washing fluid, with at least one washing fluid line leading from the washing fluid pump to the washing nozzle, and with a coupling for connecting the washing fluid line to the washing fluid pump, wherein the coupling has a plug-type coupling part and a bushing-type coupling part for receiving the plug-type coupling part.

BACKGROUND

Window cleaning systems of this type are frequently used in motor vehicles nowadays and are known in practice. In said window cleaning systems, latching and plug-in connectors are used for the connection of the washing fluid lines. For this purpose, the pump and the washing nozzles have plug-type coupling parts onto which bushing-type coupling parts of the washing fluid line are plugged. The bushing-type coupling parts of the known window cleaning system are manufactured as separate components and are fastened to the washing fluid lines.

The disadvantage of the known window cleaning system is that the couplings have to be produced and fitted in individual parts in a complicated manner. Said connectors are subsequently fitted on the washing fluid lines. The complicated manufacturing and installation of the individual components lead to very high manufacturing costs for the window cleaning system.

SUMMARY

A window cleaning system of the type mentioned at the beginning can be developed in such a manner that it can be manufactured particularly cost-effectively.

According to an embodiment, a window cleaning system for a motor vehicle, may comprise a washing fluid pump for conveying washing fluid, at least one washing nozzle for spraying washing fluid, at least one washing fluid line leading from the washing fluid pump to the washing nozzle, and a coupling for connecting the washing fluid line to the washing fluid pump, wherein the coupling has a plug-type coupling part and a bushing-type coupling part for receiving the plug-type coupling part, and wherein the washing fluid line is manufactured integrally with the plug-type coupling part. In other words, the washing fluid line together with the plug-type coupling part forms a single part.

According to a further embodiment, the washing fluid line may have a respective plug-type coupling part at each end, and the washing fluid pump and the washing nozzle each may have a bushing-type coupling part. According to a further embodiment, all of the movable components and sealing rings can be arranged on the bushing-type coupling part. According to a further embodiment, the washing fluid line can be manufactured from plastic by injection molding or extrusion. According to a further embodiment, the plug-type coupling part may have an encircling collar, and the bushing-type coupling part may have a latching hook which engages behind the collar. According to a further embodiment, the bushing-type coupling part may have a displaceable sleeve, and the sleeve may be prestressed by a spring element into a position supporting the latching hooks. According to a further embodiment, the sleeve and the spring element can be manufactured integrally, thus forming a single piece. According to a further embodiment, the sealing ring can be designed as a radial sealing ring and bears against the outer circumference of the plug-type coupling part. According to a further embodiment, the bushing-type coupling part may have a tubular basic body, the sealing ring and a component holding a plurality of latching hooks are arranged on the inside of the basic body, and the sleeve together with the spring element can be arranged on the outside of the basic body, and the basic body may have at least one opening in the region of the latching hooks.

BRIEF DESCRIPTION OF THE DRAWINGS

The invention permits numerous embodiments. To further clarify its basic principle, one of these is illustrated in the drawing and is described below. In the drawing

DETAILED DESCRIPTION

Figure 1:
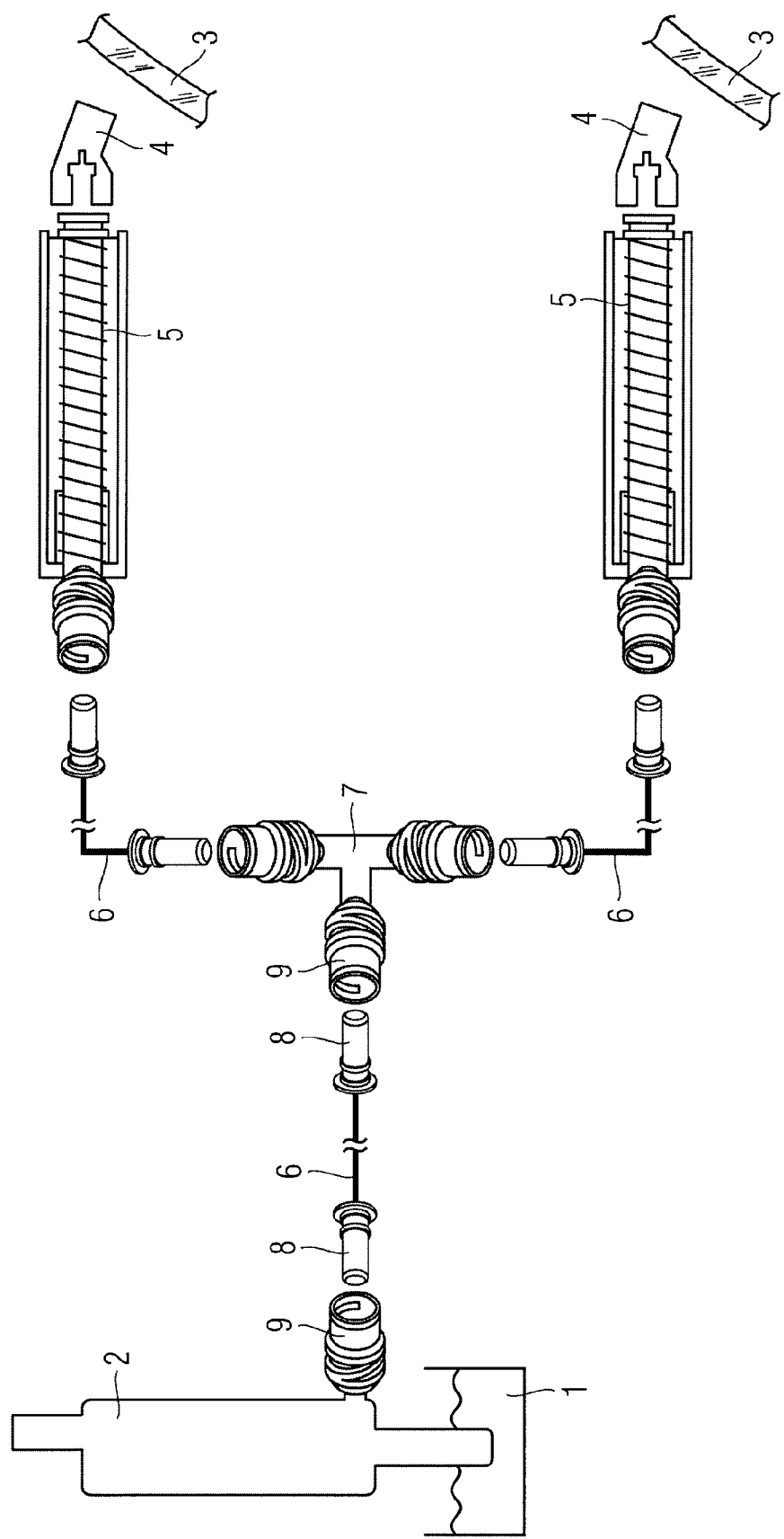
FIG. 1 shows, schematically, a window cleaning system according to an embodiment before the connection of the individual components.

By means of the design according to various embodiments, complicated manufacturing steps and installation steps at the washing fluid line are avoided. According to various embodiments, it is not necessary to fit a coupling part to the washing fluid line or to seal it. The window cleaning system according to various embodiments thereby also has a particularly small number of sealing points. Since complicated installation steps at the washing fluid pump are necessary in any case, the arrangement of the bushing-type coupling part on the washing fluid pump does not result in a substantial increase in the outlay on installation. By this means, the window cleaning system according to various embodiments can be manufactured particularly cost-effectively.

The manufacturing costs of the window cleaning system according to various embodiments are further reduced if the washing fluid line has a respective plug-type coupling part at each end, and if the washing fluid pump and the washing nozzle each have a bushing-type coupling part. By means of this design, the washing fluid line is designed as a component which can be laid in a particularly simple manner.

According to another embodiment, the washing fluid line having the plug-type coupling parts proves particularly simple structurally if all of the movable components and sealing rings are arranged on the bushing-type coupling part. Said design furthermore results in a further reduction in the manufacturing costs of the window cleaning system according to various embodiments.

The manufacturing costs of the window cleaning system according to various embodiments are further reduced if the washing fluid line is manufactured from plastic by injection molding or extrusion.

According to another embodiment, the installation of the coupling proves particularly simple if the plug-type coupling part has an encircling collar, and the bushing-type coupling part has a latching hook which engages behind the collar.

Inadvertent release of the coupling can be avoided in a simple manner, according to another embodiment, if the bushing-type coupling part has a displaceable sleeve, and if the sleeve is prestressed by a spring element into a position supporting the latching hooks. By means of this design, the sleeve is capable of supporting the latching hooks when they engage behind the edge of the plug-type coupling part.

The manufacturing costs of the coupling are reduced, according to another embodiment, if the sleeve and the spring element are manufactured integrally.

According to another embodiment, tolerances between the coupling parts are reliably compensated for if the sealing ring is designed as a radial sealing ring and bears against the outer circumference of the plug-type coupling part.

According to another embodiment, the bushing-type coupling part proves particularly simple structurally if the bushing-type coupling part has a tubular basic body, if the sealing ring and a component holding a plurality of latching hooks are arranged on the inside of the basic body, and the sleeve together with the spring element is arranged on the outside of the basic body, and if the basic body has at least one opening in the region of the latching hooks.

FIG. 1 shows a window cleaning system for a motor vehicle, with a washing fluid pump 2 which sucks washing fluid out of a supply container 1. The washing fluid pump 2 conveys washing fluid to washing nozzles 4 arranged in front of windows 3 of the motor vehicle. The washing nozzles 4 are each arranged on a telescopically movable tube 5 and are moved over the windows 3 during operation of the pump. Washing nozzles 4 of this type are known in general as lifting nozzles. The washing fluid pump 2 is connected to the washing nozzles 4 via washing fluid lines 6 and a T connector 7. The washing fluid lines 6 are each manufactured integrally with plug-type coupling parts 8 arranged at their ends. The washing fluid pump 2, the washing nozzles 4 and the T connector 7 each have bushing-type coupling parts 9. FIG. 1 illustrates the window cleaning system before the plug-type coupling parts 8 are connected to the bushing-type coupling parts 9.

Figure 2:
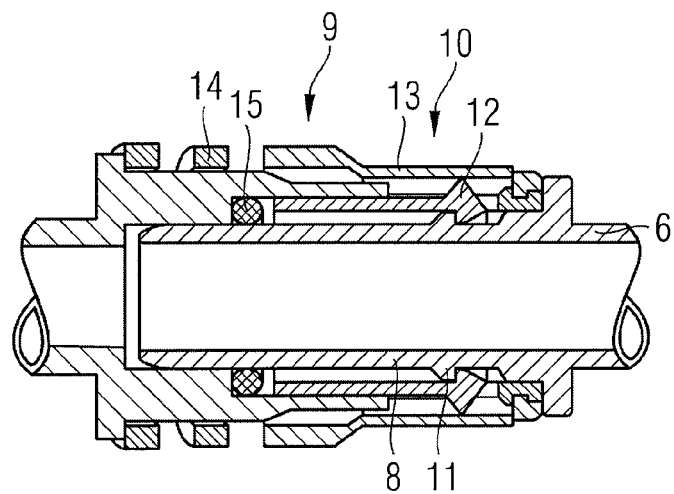
FIG. 2 shows a sectional illustration of a coupling of the window cleaning system according to an embodiment.

FIG. 2 shows a coupling 10 which is produced by plugging together a plug-type coupling part 8 and a bushing-type coupling part 9 and via which the washing fluid line 6 is connected in a form-fitting and sealing manner to the washing fluid pump 2, the washing nozzles 4 or the T connector 7. It can be seen here that the plug-type coupling part 8 has an encircling collar 11 which is engaged behind by latching hooks 12 held by the bushing-type coupling part 9. The latching hooks 12 are supported on the inside of a sleeve 13. The sleeve 13 is prestressed by a spring element 14 into the position illustrated and can be pressed out of the region of movement of the latching hooks 12 in order to release the coupling 10. The sleeve 13 and the spring element 14 are manufactured integrally. In addition, the bushing-type coupling part 9 supports a sealing ring 15 which bears against the circumference of the plug-type coupling part 8.

Figure 3:
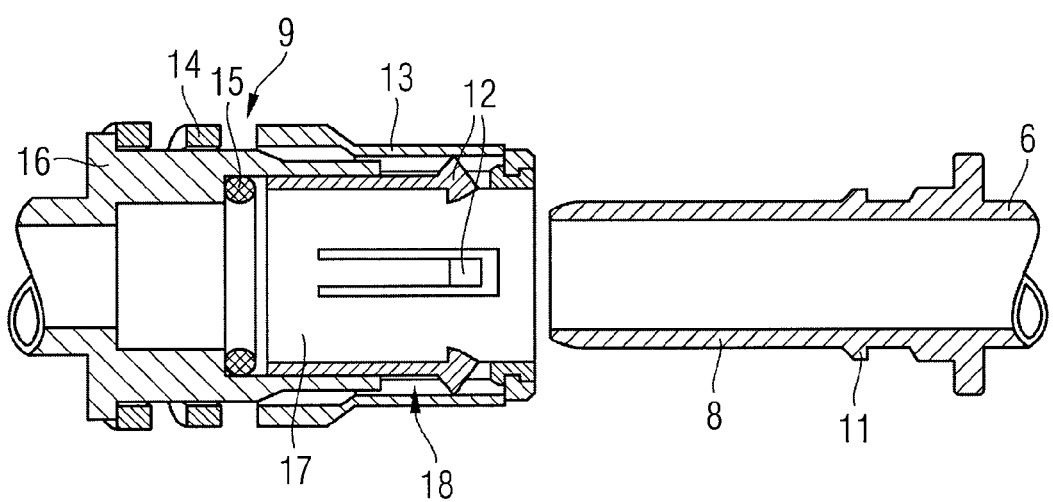
FIG. 3 shows the coupling from FIG. 2 before the installation.

FIG. 3 shows the coupling 10 from FIG. 2 before the coupling parts 8, 9 are plugged together. It can be seen here that the plug-type coupling part 8 which is manufactured integrally with the washing fluid line 6 does not have any components to be fitted. The bushing-type coupling part 9 has a tubular basic body 16, on the outside of which the sleeve 13 together with the spring element 14 is guided displaceably. The latching hooks 12 with an annular element 17 holding the latching hooks 12, and the sealing ring 15 are arranged on the inside of the basic body 16. The basic body 16 has openings 18 arranged in each case in the region of the latching hooks 12. In order to install the coupling 10, the sleeve 13 is pushed back counter to the force of the spring element 14, and the plug-type coupling part 8 is introduced into the bushing-type coupling part 9 until the latching hooks 12 engage behind the encircling collar 11. The sleeve 13 is subsequently released and supports the latching hooks 12.

What is claimed is:

1. A window cleaning system for a motor vehicle, comprising:
    a washing fluid pump for conveying washing fluid,
    at least one washing nozzle for spraying washing fluid,
    at least one washing fluid line leading from the washing fluid pump to the washing nozzle, and
    a coupling for connecting the washing fluid line to the washing fluid pump,
    wherein the coupling has a plug-type coupling part and a bushing-type coupling part for receiving the plug-type coupling part,
    wherein the washing fluid line is manufactured integrally with the plug-type coupling part,
    wherein the plug-type coupling part comprises an encircling collar having a tapered leading surface and a non-tapered trailing mating surface, and the bushing-type coupling part comprises an annular element receiving the plug-type coupling part,
    wherein the annular element comprises a plurality of latching hooks integral with said annular element which engages behind the collar, each latching hook having a tapered leading surface and a non-tapered trailing mating surface,
    wherein the tapered leading surface of each latching hook is configured to engage with the tapered leading surface of the encircling collar during insertion of the plug-type coupling part in the bushing-type coupling part, and
    wherein the non-tapered trailing surface of each latching hook being configured to engage with the non-tapered trailing surface of the encircling collar such that the engagement between the respective non-tapered trailing surfaces of the latching hooks and the encircling collar resist axial removal of the plug-type coupling part from the bushing-type coupling part;
    wherein the bushing-type coupling part has a displaceable sleeve, and the displaceable sleeve is prestressed by a compression spring element into a position supporting the latching hooks and wherein the compression spring element has windings integrally formed with the displaceable sleeve on one side and in contact with the annular element on another side.

2. The window cleaning system according to claim 1, wherein the washing fluid line has a respective plug-type coupling part at each end, and the washing fluid pump and the washing nozzle each have a bushing-type coupling part.

3. The window cleaning system according to claim 1, wherein only the bushing-type coupling part comprises movable components and sealing rings.

4. The window cleaning system according to claim 1, wherein the washing fluid line is manufactured from plastic by injection molding or extrusion.

5. The window cleaning system according to claim 1, comprising four latching hooks arranged at angles of 90 degrees around a circumference of the annular element.

6. The window cleaning system according to claim 1, further comprising a sealing ring which is designed as a radial sealing ring and bears against the outer circumference of the plug-type coupling part.

7. The window cleaning system according to claim 1, wherein the bushing-type coupling part has a tubular basic body, wherein a sealing ring and said annular element comprising the plurality of latching hooks are arranged on the inside of the tubular basic body, and the sleeve together with the compression spring element is arranged on the outside of the basic body.

8. The window cleaning system according to claim 1, wherein each latching hook is formed integrally within the annular element by a respective U-shaped cut-out in the annular element.

9. A window cleaning system for a motor vehicle, comprising
- a washing fluid pump for conveying washing fluid,
- at least one washing nozzle for spraying washing fluid,
- at least one washing fluid line leading from the washing fluid pump to the washing nozzle, and
- a coupling for connecting the washing fluid line to the washing fluid pump,
- wherein the coupling has a plug-type coupling part and a bushing-type coupling part for receiving the plug-type coupling part,
- wherein the washing fluid line together with the plug-type coupling part forms a single piece, and
- wherein the plug-type coupling part comprises an encircling collar having a tapered leading surface and a non-tapered trailing mating surface, and the bushing-type coupling part comprises an annular element receiving the plug-type coupling part, wherein the annular element comprises a plurality of latching hooks integral with said annular element which engages behind the collar, each latching hook having a tapered leading surface and a non-tapered trailing mating surface,
- wherein the tapered leading surface of each latching hook is configured to engage with the tapered leading surface of the encircling collar during insertion of the plug-type coupling part in the bushing-type coupling part, and
- wherein the non-tapered trailing surface of each latching hook being configured to engage with the non-tapered trailing surface of the encircling collar such that the engagement between the respective non-tapered trailing surfaces of the latching hooks and the encircling collar resist axial removal of the plug-type coupling part from the bushing-type coupling part;
- wherein the bushing-type coupling part has a displaceable sleeve, and the displaceable sleeve is prestressed by a compression spring element into a position supporting the latching hooks and wherein the compression spring element has windings integrally formed with the displaceable sleeve on one side and in contact with the annular element on another side.

10. The window cleaning system according to claim 9, wherein the washing fluid line has a respective plug-type coupling part at each end, and the washing fluid pump and the washing nozzle each have a bushing-type coupling part.

11. The window cleaning system according to claim 9, wherein only the bushing-type coupling part comprises movable components and sealing rings.

12. The window cleaning system according to claim 9, wherein the washing fluid line is manufactured from plastic by injection molding or extrusion.

13. The window cleaning system according to claim 9, comprising four latching hooks arranged at angles of 90 degrees around a circumference of the annular element.

14. The window cleaning system according to claim 9, further comprising a sealing ring which is designed as a radial sealing ring and bears against the outer circumference of the plug-type coupling part.

15. The window cleaning system according to claim 9, wherein the bushing-type coupling part has a tubular basic body, wherein a sealing ring and said annular element comprising the plurality of latching hooks are arranged on the inside of the tubular basic body, and the sleeve together with the compression spring element is arranged on the outside of the basic body.

16. The window cleaning system according to claim 9, wherein each latching hook is formed integrally within the annular element by a respective U-shaped cut-out in the annular element.

\* \* \* \* \*